United States Patent
Hirose et al.

(10) Patent No.: US 8,826,947 B2
(45) Date of Patent: Sep. 9, 2014

(54) VALVE DEVICE FOR FUEL TANK AND OVERFILLING PREVENTING DEVICE FOR FUEL TANK

(75) Inventors: Takatsugu Hirose, Sagamihara (JP); Itsuo Honda, Kamakura (JP); Motoharu Takai, Fujisawa (JP); Shinzo Watanabe, Sagamihara (JP)

(73) Assignee: Nifco Inc., Yokohama-shi (JP)

( * ) Notice: Subject to any disclaimer, the term of this patent is extended or adjusted under 35 U.S.C. 154(b) by 975 days.

(21) Appl. No.: 12/736,474

(22) PCT Filed: Apr. 16, 2009

(86) PCT No.: PCT/JP2009/057649
§ 371 (c)(1),
(2), (4) Date: Feb. 25, 2011

(87) PCT Pub. No.: WO2009/128499
PCT Pub. Date: Oct. 22, 2009

(65) Prior Publication Data
US 2011/0139301 A1    Jun. 16, 2011

(30) Foreign Application Priority Data

Apr. 18, 2008  (JP) .................................. 2008-108879
Feb. 12, 2009  (JP) .................................. 2009-029979

(51) Int. Cl.
*B60K 15/04*        (2006.01)
*B60K 15/035*       (2006.01)
*F16K 24/04*        (2006.01)
*F02M 37/00*        (2006.01)

(52) U.S. Cl.
CPC ............. *B60K 15/035* (2013.01); *F16K 24/044* (2013.01); *F02M 37/0082* (2013.01)

USPC ............. 141/44; 141/95; 141/198; 220/86.2; 137/202

(58) Field of Classification Search
USPC ............... 141/44, 95, 198; 220/86.2; 137/202
See application file for complete search history.

(56) References Cited

U.S. PATENT DOCUMENTS 5,172,714 A * 12/1992 Kobayashi et al. .............. 137/39
5,687,778 A * 11/1997 Harris ............................. 141/59

(Continued)

FOREIGN PATENT DOCUMENTS

JP    S54-177789 U    12/1979
JP    S59-110228 U     7/1984

(Continued)

OTHER PUBLICATIONS

Chinese Patent Office, "Office Action for CN200980113489.0", Oct. 10, 2012.

*Primary Examiner* — Nicolas A Arnett
(74) *Attorney, Agent, or Firm* — Manabu Kanesaka

(57) ABSTRACT

A valve device used by being attached to a fuel tank includes a case provided with an airflow valve opening which communicates with the outside of the tank, on an upper portion, and also provided with a fuel inflow section located on a lower side of the airflow valve opening, and a float body housed in the case so as to be vertically movable, and also seated in the airflow valve opening by being elevated by the fuel flowed into the case through the inflow section. In the case, an airflow section which interconnects the inside of the tank and the inside of the case is formed in a higher side than a waterline of the float body at the seating time, and also at the seating time, this airflow section is restricted.

15 Claims, 17 Drawing Sheets

(56) References Cited

U.S. PATENT DOCUMENTS

| | | |
|---|---|---|
| 6,557,595 B2 | 5/2003 | Ozaki |
| 6,564,821 B1 * | 5/2003 | Orenstein et al. ............. 137/202 |
| 6,913,295 B2 * | 7/2005 | Kimisawa et al. ............ 285/423 |
| 7,188,613 B2 * | 3/2007 | Miura et al. .................. 123/516 |
| 7,234,452 B2 * | 6/2007 | Mills ............................ 123/516 |
| 7,273,042 B2 | 9/2007 | Kito |
| 7,448,365 B2 * | 11/2008 | Mills ............................ 123/516 |
| 8,307,840 B2 * | 11/2012 | Kobayashi et al. .......... 137/202 |
| 2001/0054452 A1 | 12/2001 | Ozaki |
| 2004/0221890 A1 * | 11/2004 | Takahashi et al. ........... 137/202 |
| 2005/0284875 A1 | 12/2005 | Kito |
| 2006/0130816 A1 * | 6/2006 | Mills ............................ 123/519 |
| 2006/0225785 A1 * | 10/2006 | Oosaki ......................... 137/202 |
| 2007/0006919 A1 * | 1/2007 | Tagami et al. ............... 137/202 |
| 2008/0041347 A1 * | 2/2008 | Mills ............................ 123/518 |
| 2009/0000668 A1 * | 1/2009 | Roscher et al. .............. 137/202 |
| 2010/0224265 A1 * | 9/2010 | Kobayashi et al. .......... 137/202 |

FOREIGN PATENT DOCUMENTS

| | | |
|---|---|---|
| JP | H07-257204 A | 10/1995 |
| JP | 2001-138755 | 5/2001 |
| JP | 2002-002314 A | 1/2002 |
| JP | 2006-097538 A | 4/2006 |
| KR | 10-2009-0043885 A | 5/2009 |

\* cited by examiner

VALVE DEVICE FOR FUEL TANK AND OVERFILLING PREVENTING DEVICE FOR FUEL TANK

FIELD OF TECHNOLOGY

This invention relates to an improvement of a valve device which is attached to a fuel tank for an automobile, two-wheeled motorcar, and the like, and functions so as to interconnect the inside and outside of the tank in an open valve state.

BACKGROUND ART

As a valve device having a cutoff valve for a fuel tank and detection means for a full tank, there is a valve device shown in Patent Document 1. This device comprises an evaporator opening in an upper portion of a housing where a float valve is housed, and a fuel opening in the lowest portion. When a fuel liquid surface reaches the fuel opening by fueling, the float valve is elevated and blocks the evaporator opening. Thereby, the fuel liquid level inside a filler pipe is elevated, and the fueling is stopped by allowing a sensor of a fueling gun to detect the full tank. In the upper portion of the housing of this device, a through-hole is provided. Once the fueling is stopped, due to airflow through this through-hole, a pressure inside the housing and a pressure inside the tank are attempted to be balanced, and the fuel liquid level inside the housing declines, so that the float valve descends. This allows the airflow through the through-hole and the evaporator opening to be carried out, so that the pressure inside the tank declines, and the fuel liquid level inside the filler pipe also declines so as to create a possible state for additional fueling. However, in the device shown in Patent Document 1, since only such through-hole is simply provided in the housing, the float valve could easily descend immediately after the detection of the full tank. If the fuel liquid level inside the filler pipe declines immediately after the detection of the full tank, an automatic stop of the fueling gun is released, and additional fueling becomes immediately possible, so that overfilling occurs.

PRIOR ART DOCUMENTS

Patent Documents

Patent Document 1: Japanese Patent Publication No. 3909837

DISCLOSURE OF THE INVENTION

Problems to be Solved by the Invention

A main object to be solved by the present invention is that in this kind of device for a fuel tank, after the fueling is stopped by allowing the sensor of the fueling gun to detect the full tank due to the elevation of the fuel liquid level inside the filler pipe, the immediate decline of the fuel liquid level inside this filler pipe can be prevented.

Means for Solving the Problems

In order to achieve the above-mentioned object, in the present invention, from a first perspective, a valve device for a fuel tank is a valve device attached to the fuel tank, and comprises a case provided with an airflow valve opening which communicates with the outside of the tank, on an upper portion, and also a fuel inflow section located below the airflow valve opening. Also, the valve device for the fuel tank comprises a float body housed inside this case so as to be vertically movable and also seated in the above-mentioned airflow valve opening by being elevated by the fuel flowed into the case through the above-mentioned inflow section. In the case, in a higher place than a waterline of the float body at the above-mentioned seating time, an airflow section interconnecting the inside of the tank and the inside of the case is formed, and also at the above-mentioned seating time, this airflow section is restricted.

If a fuel liquid level inside the tank reaches the inflow section of the case, the pressure inside the tank is elevated, and since the pressure inside the case is lower than that inside the tank, the fuel flows in the inside of the case. When the fuel flowed in the inside of the case reaches a predetermined liquid level, the float body is elevated and the airflow valve opening is blocked. Thereby, the fuel liquid level inside a filler pipe is elevated and allows a sensor of a fueling gun to detect a full tank. When the fueling is stopped, due to the airflow through the airflow section, a pressure difference between the inside of the tank and the inside of the case gradually diminishes, the fuel liquid level inside the case declines, the float body descends, and the airflow valve opening is opened again. After that, the airflow through the airflow section and the airflow valve opening is carried out, and the fuel liquid level inside the filler pipe is also descended. Here, in the valve device according to the present invention, since the above-mentioned airflow section is restricted at the seating time of the above-mentioned float body, after the sensor of the fueling gun detects the full tank and the fueling thereof is stopped, the difference between the pressure inside the case and the pressure inside the tank can be gradually decreased, and overfilling of the fuel tank can be prevented by preventing the immediate decline of the fuel liquid level inside the filler pipe.

Such airflow section is configured by a first through-hole as a main airflow section and a second through-hole as a sub-airflow section. At the seating time of the float body, the main airflow section is blocked, and the pressure inside the tank and the pressure inside the case may be attempted to be gradually balanced by the sub-airflow section. Also, such main airflow section may be blocked by this float body at the seating time of the float body. Also, a flow passage cross-sectional area of the second through-hole as the sub-airflow section may be made smaller than a flow passage cross-sectional area of the main airflow section. As a result, a function for preventing the difference between the pressure inside the case and the pressure inside the tank from immediately diminishing after the full tank, can effectively work without increasing the number of components.

Also, one portion of the float body is inserted into the airflow section at the above-mentioned seating time, so that the airflow section may be restricted. In this case, if one portion of the float body is inserted into the airflow section from a lower side at the above-mentioned seating time, and also if one portion of this float body comprises a portion whose transverse area is the largest between upper and lower ends thereof, regardless of the size of an insertion amount of one portion of such float body relative to the airflow section, an airflow amount of the airflow section in this restricted state can be maintained in a certain value as much as possible. If one portion of the float body is inserted into the airflow section from the lower side at the above-mentioned seating time, and also even if this airflow section comprises the portion whose flow passage is the narrowest between upper and lower openings thereof, the same effect can be obtained.

Also, the above-mentioned airflow section may be configured by a notch portion which is formed in the case and opened upwardly and laterally, and also one portion of the float body is inserted into this notch portion at the seating time, so that the airflow section may be restricted. Also, the above-mentioned airflow section may be configured by a depressed portion formed in an upper portion of the case and the through-holes formed in side walls of this depressed portion, and also one portion of the float body is inserted into this depressed portion at the above-mentioned seating time, so that the airflow section may be restricted. Also, by a sub-float which is elevated the most at the above-mentioned seating time of the float body, the airflow section may be restricted.

Also, in order to achieve the above-mentioned object, in the present invention, from a second perspective, an overfilling preventing device for the fuel tank comprises interconnection means interconnecting a space on a fuel liquid surface inside the fuel tank and the outside of the tank; fueling stop means which allows the fuel liquid level inside the filler pipe to elevate by elevating the pressure inside the tank by blocking the interconnection due to the above-mentioned interconnection means using the elevation of the fuel liquid level by pouring the fuel into the tank, and allows the sensor of the fueling gun to detect the full tank; decompression means for the pressure inside the tank which creates the decline of the fuel liquid level inside the filler pipe after the detection of this full tank; and delay means delaying the decline of the fuel liquid level inside the filler pipe by this decompression means.

Such device allows the fueling into the tank by the above-mentioned interconnection means, and also when the fuel liquid level reaches the predetermined liquid level by pouring the fuel into the tank, the above-mentioned interconnection is blocked, and the fueling is stopped at this predetermined liquid level as a full tank liquid level. After the fueling stops, the fuel liquid level inside the filler pipe declines by the above-mentioned decompression means. However, due to the above-mentioned delay means, this immediate decline can be prevented. Thereby, immediately after the sensor of the fueling gun detects the full tank and stops the fueling thereof, this detection is halted, and the fueling can be prevented from starting again, so that the overfilling of the fuel tank can be prevented.

Effect of the Invention

According to the present invention, a device, having an airflow of the inside and the outside of the fuel tank and also comprising a preventing mechanism for overfilling, can be provided reliably preventing this overfilling without a complicated structure.

BRIEF DESCRIPTION OF THE DRAWINGS

FIGS. 10(a), 10(b) show the essential parts of the third example, wherein FIG. 10(a) shows a previous state of the seating of the float body, and FIG. 10(b) shows a state of a seating time thereof, respectively.

FIGS. 11(a), 11(b) show modified examples of a projecting portion in the third example, wherein FIG. 11(a) shows the previous state of the seating of the float body, and FIG. 11(b) shows the state of the seating time thereof, respectively.

BEST MODES OF CARRYING OUT THE INVENTION

Figure 8:
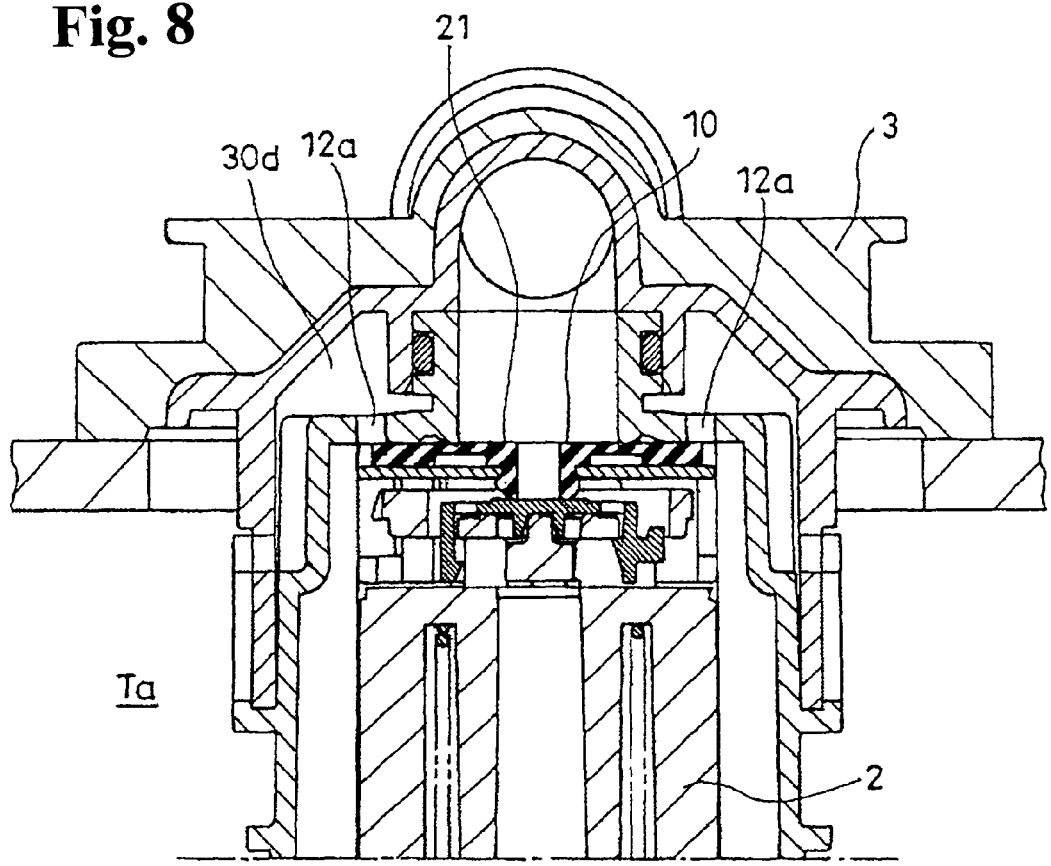
FIG. 8 shows the essential parts of a second example of the valve device which is made by changing one portion of the structure of the first example in cross-section. (The float body is in the seated state.)
Figure 9:
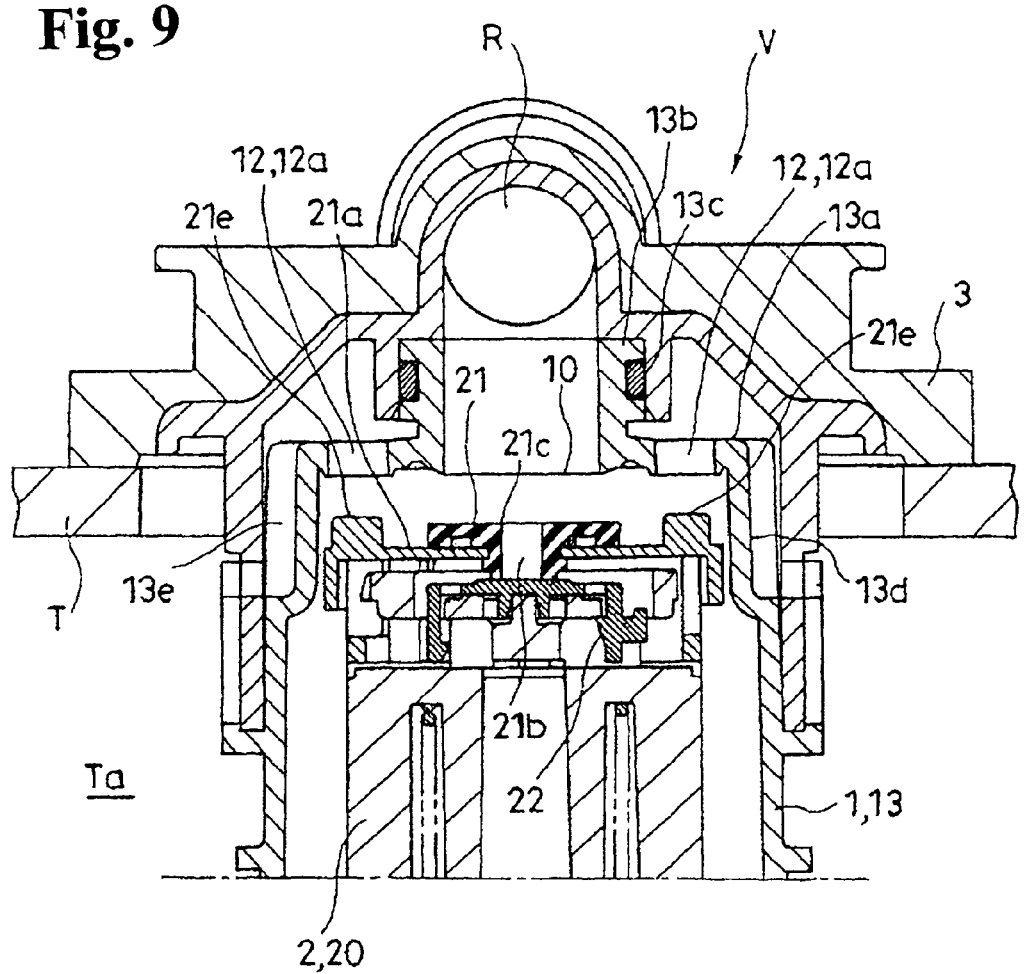
FIG. 9 shows the essential parts of a third example of the valve device which is made by changing one portion of the structure of the first example in cross-section.
Figure 10A:
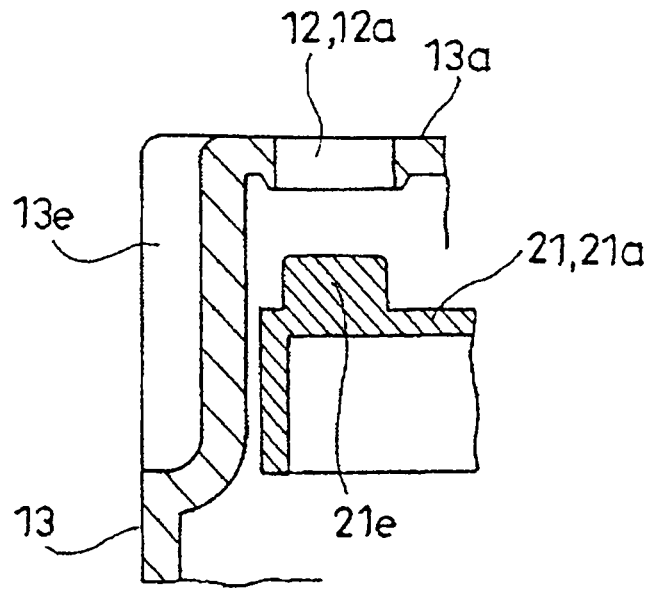
Figure 10B:
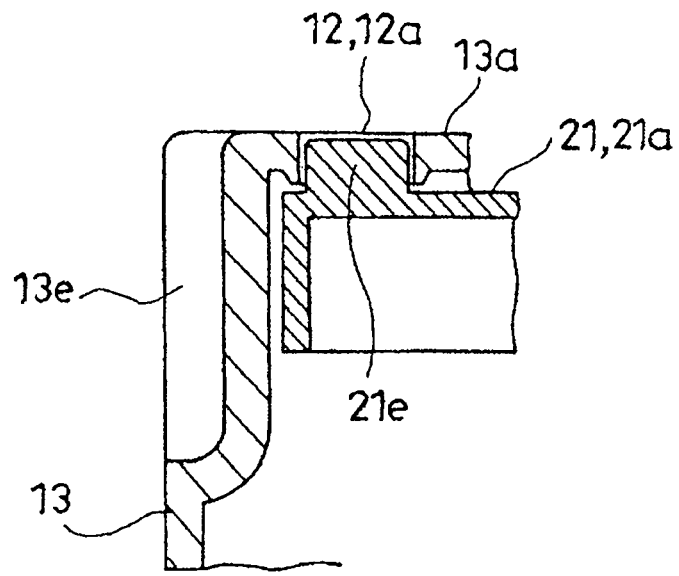
Figure 13A:
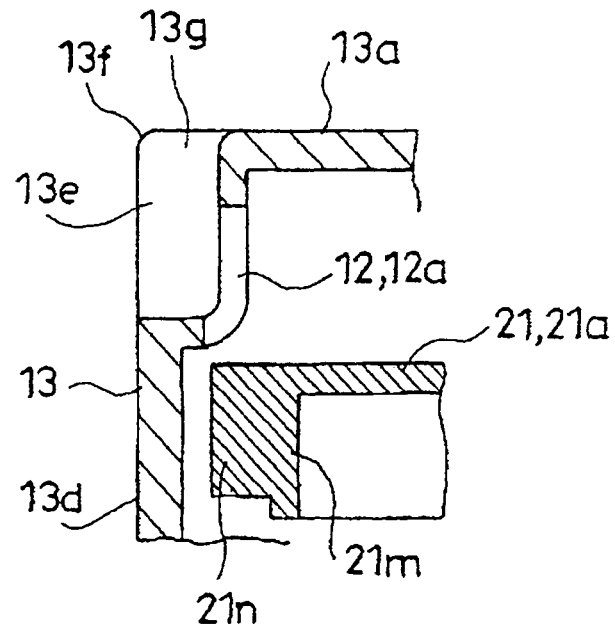
FIGS. 13(a), 13(b) show the essential parts of a fourth example of the valve device which is made by changing one portion of the structure of the first example in cross-section.
Figure 13B:
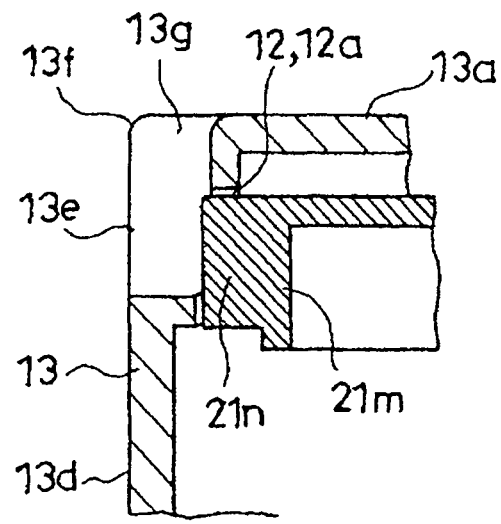
Figure 14A:
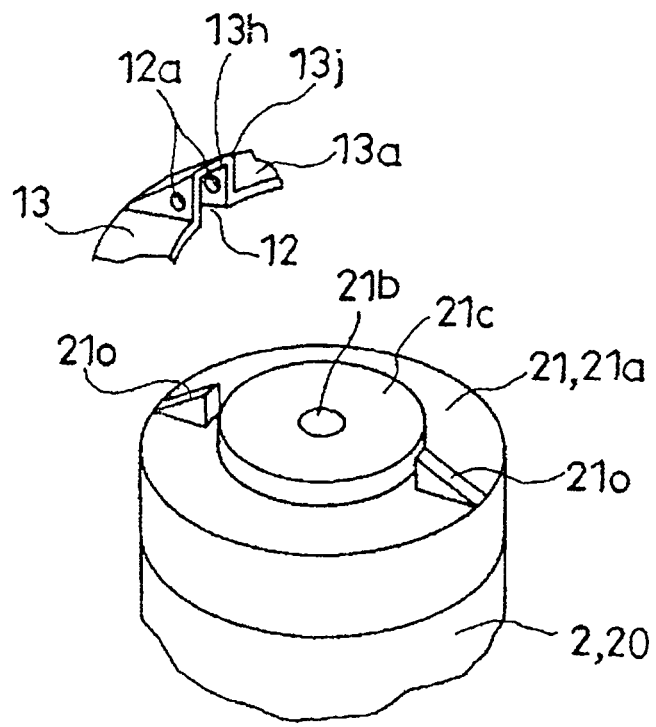
FIG. 14(a) shows the essential parts of a fifth example of the valve device which is made by changing one portion of the structure of the first example as a perspective state.
Figure 14B:
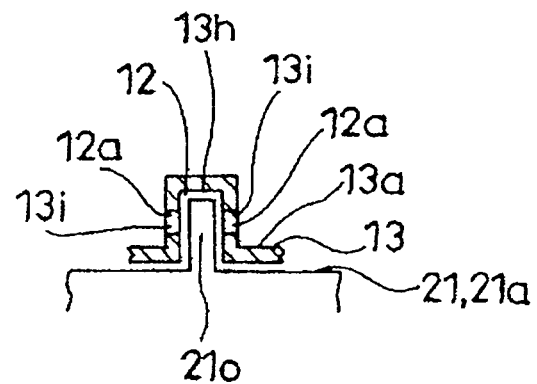
FIG. 14(b) shows the essential parts thereof at the seating time of the float body in cross-section.
Figure 15A:
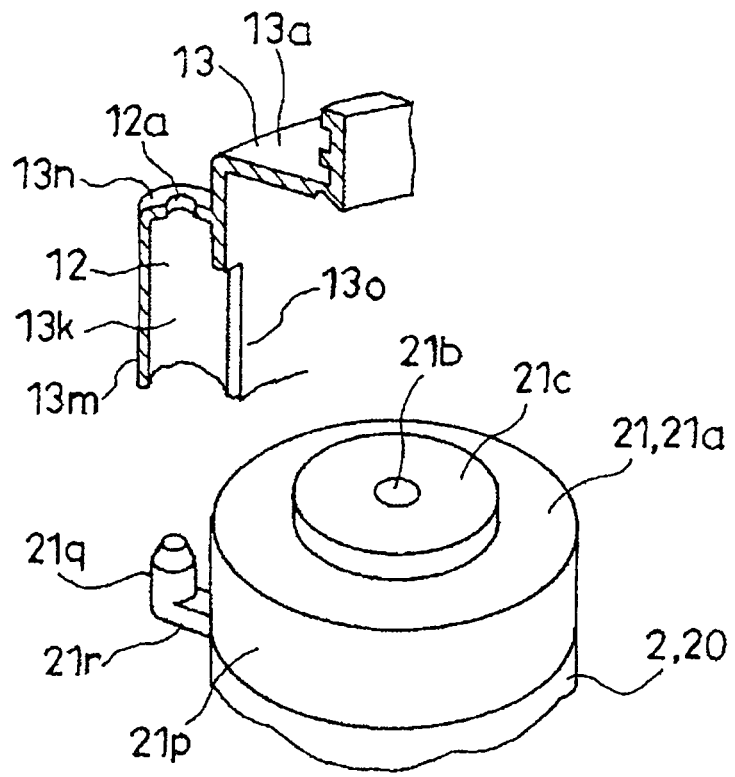
FIG. 15(a) shows the essential parts of a sixth example of the valve device which is made by changing one portion of the structure of the first example as a perspective state.
Figure 15B:
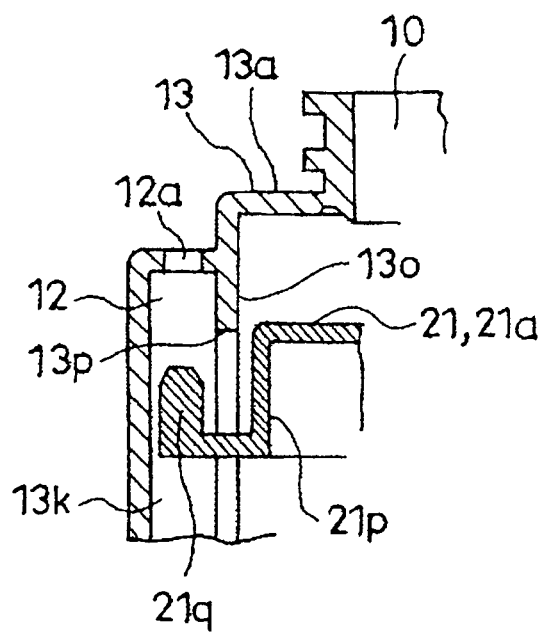
FIG. 15(b) shows the essential portions thereof in cross-section.
Figure 16A:
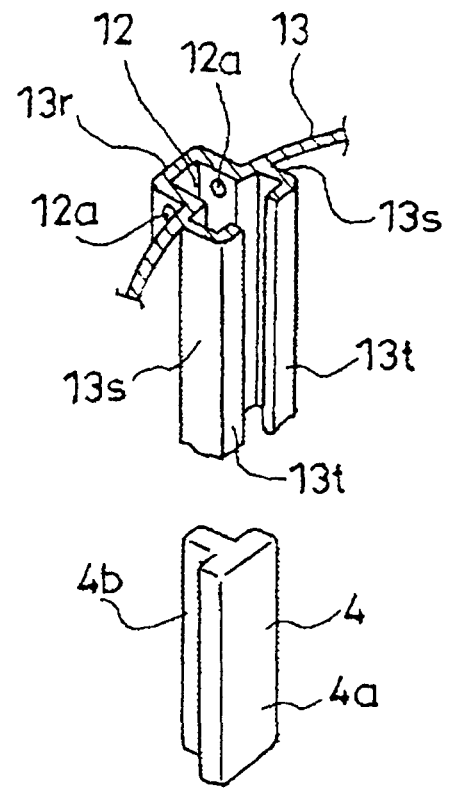
FIG. 16(a) shows the essential parts of a seventh example of the valve device which is made by changing one portion of the structure of the first example as a perspective state.
Figure 16B:
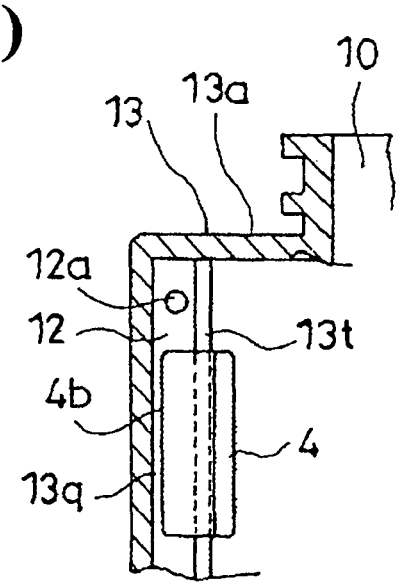
FIG. 16(b) shows the essential portions thereof in cross-section.

Hereinafter, best modes of the present invention will be explained with reference to FIGS. 1 to 17(b). Incidentally, FIGS. 1 to 7 show a first example of a valve device V structured by applying the present invention; FIG. 8 shows a second example of the valve device V where one portion of the structure of such first example is changed; FIGS. 9 to 12(c) show a third example of the valve device V where one portion of the structure of such first example is changed; FIGS. 13(a), 13(b) show a fourth example of the valve device V where one portion of the structure of such first example is changed; FIGS. 14(a), 14(b) show a fifth example of the valve device V where one portion of the structure of such first example is changed; FIGS. 15(a), 15(b) show a sixth example of the valve device V where one portion of the structure of such first example is changed; FIGS. 16(*a*), 16(*b*) show a seventh example of the valve device V where one portion of the structure of such first example is changed; and FIGS. 17(*a*), 17(*b*) show an eighth example of the valve device V where one portion of the structure of such first example is changed, respectively.

The valve device V for a fuel tank T according to the present embodiment is attached to the fuel tank T for an automobile, two-wheeled motorcar, and the like, and functions so as to interconnect a tank inside and outside Ta, Tb in an open valve state.

Typically, such valve device V is attached to an upper portion of the fuel tank T, and configures one portion of a connecting passage (airflow path R) relative to the fuel tank T. Specifically, such valve device V configures interconnection means interconnecting a space on a fuel liquid surface inside the fuel tank T and the tank outside Tb.

Also, such valve device V comprises an inflow section and a float body 2 which become fueling stop means. The fueling stop means allows a fuel liquid level L2 inside a filler pipe P to elevate by the elevation of a pressure of the tank inside Ta by blocking the interconnection due to the above-mentioned interconnection means using the elevation of a fuel liquid level L1 by pouring fuel into the tank inside Ta, and allows a sensor of a fueling gun G to detect a full tank.

Also, such valve device V comprises an airflow section which becomes decompression means for the pressure of the tank inside Ta which creates the decline of the fuel liquid level L2 inside the filler pipe P after the detection of the above-mentioned full tank.

Also, such valve device V comprises a structure which becomes delay means delaying the decline of the fuel liquid level L2 inside the filler pipe P by such decompression means. Specifically, as hereinafter mentioned, the valve device V comprises a structure restricting the above-mentioned airflow section 12 at a seating time of the float body 2 relative to an airflow valve opening 10.

Consequently, such valve device V functions as an overfilling preventing device for the fuel tank T. Specifically, such valve device V becomes the above-mentioned interconnection means and allows the fueling into the tank inside Ta, and also when the fuel liquid level L1 of the tank inside Ta reaches a predetermined liquid level by pouring the fuel into the tank inside Ta, the above-mentioned interconnection is blocked, so that the fueling is stopped at this predetermined liquid level as a full tank liquid level. After the fueling stops, the fuel liquid level L2 inside the filler pipe P is descended by the above-mentioned decompression means. However, the above-mentioned delay means can prevent the fuel liquid level L2 from immediately descending. Thereby, immediately after the sensor of the fueling gun G detects the full tank and stops the fueling thereof, this detection is halted, and the fueling can be prevented from starting again, so that overfilling to the fuel tank T can be prevented.

Therefore, such valve device V can be used as a valve including both functions as a cutoff valve and an overfilling preventing valve without any problem.

Such valve device V comprises a case 1 and the float body 2.

In the case 1, the airflow valve opening 10 communicating with the tank outside Tb is provided in an upper portion thereof, and the inflow section 11 for the fuel is provided in a part lower than the airflow valve opening 10. Also, in the case 1, in a part higher than a water line L3 of the float body 2 at the after-mentioned seating time, the airflow section 12, which allows the tank inside Ta and the inside of the case 1 to be interconnected, is formed.

In the first example shown in FIGS. 1 to 7, the case 1 is configured by an upper body 13 and a lower body 14. The upper body 13 is configured so as to form a cylindrical shape. The upper end of a cylinder of the upper body 13 is blocked by a top plate portion 13*a* comprising the circular airflow valve opening 10 in the center. On an upper face of the top plate portion 13*a*, a short-sized cylinder-like portion 13*b* which projects upwardly from this top plate portion 13*a* is integrally formed with the top plate portion 13*a* by interconnecting an inside space of the cylinder to the airflow valve opening 10. On the outside of this short-sized cylinder-like portion 13*b*, a seal ring 13*c* is fitted in. A lower end of the cylinder of the upper body 13 is open. On the other hand, the lower body 14 is configured so as to form the cylindrical shape wherein both upper and lower ends of the cylinder are open. On an upper portion of the lower body 14 and in the center of an inside thereof, a short-sized cylinder-like body 14*a* is supported by cross-bridge pieces 14*b* ranging between an outer face of this short-sized cylinder-like body 14*a* and an inner face of the lower body 14. The above-mentioned airflow path R is formed between adjacent cross-bridge pieces 14*b*. An outer diameter of the upper end of the cylinder of the lower body 14 is configured so as to become approximately equal to an inner diameter of the lower end of the cylinder of the upper body 13. In the illustrated example, the case 1 is configured by fitting the upper end of the cylinder of the lower body 14 in the inside of the upper body 13 from the lower end of the cylinder of the upper body 13. Such fit-in portion is sealed by a seal ring 14*c* fitted in the outside of the upper end of the cylinder of the lower body 14 in an air-tight state. The case 1 configured in this manner allows the lower end of the cylinder of the lower body 14 to function as the above-mentioned inflow section 11.

In the first example shown in FIGS. 1 to 7, such case 1 is combined with a flange 3, and attached to the fuel tank T by this flange 3. The flange 3 includes a head portion 30 and a cylinder-like connecting portion 31 which projects downwardly from the head portion 30. In the head portion 30, a connecting tube portion 30*a* which projects laterally is integrally provided, and this connecting tube portion 30*a* is interconnected to a space inside the cylinder-like connecting portion 31 in the center of the head portion 30. This interconnecting portion 30*b* is surrounded by a circling rising portion 30*c* inside the flange 3. In the illustrated example, the upper portion of the upper case 1 is fitted in the inside of the cylinder-like connecting portion 31 of the flange 3 so as to insert the short-sized cylinder-like portion 13*b* of the upper body 13 into the circling rising portion 30*c* of the flange 3. Accordingly, the flange 3 and the case 1 are integrated. The short-sized cylinder-like portion 13*b* of the upper body 13 and the circling rising portion 30*c* of the flange 3 are sealed in an air-tight state by the above-mentioned seal ring 13*c*. Thereby, the tank inside and outside Ta, Tb are interconnected through the inflow section 11 of the case 1, the airflow valve opening 10, and the connecting tube portion 30*a*. The case 1 is disposed in the tank inside Ta by being inserted into an attachment hole Tc provided in the fuel tank T with a size, not to allow the head portion 30 of such flange 3 to be inserted, from the outside. The head portion 30 of the flange 3 is fixed to an outer face portion of the fuel tank T by welding and the like so as to be mounted on the fuel tank T.

Also, in the first example shown in FIGS. 1 to 7, first through-holes 12*a* which interconnect the inside and outside of the case 1 are formed in the top plate portion 13*a* of the upper body 13 and on lateral sides of the airflow valve opening 10. Also, a groove portion 13*e*, comprising a groove upper end which is open in the top plate portion 13*a* and extending downwardly, is formed on an outer face of a side portion 13d on an upper portion side of the upper body 13. An airflow hole 31a interconnected to this groove portion 13e is formed in the cylinder-like connecting portion 31 of the flange 3, and also a space 30d is formed between the top plate portion 13a of the upper body 13 and an upside inner face of the flange 3. Also, in the illustrated example, inside this groove portion 13e, a second through-hole 12b interconnecting the inside and outside of the case 1 is formed. In the illustrated example, the above-mentioned airflow section 12 is configured by such first and second through-holes 12a, 12b.

The float body 2 is housed in the above-mentioned case 1 so as to be vertically movable, and also seated in the above-mentioned airflow valve opening 10 by being elevated by the fuel flowed into the case 1 through the above-mentioned inflow section 11. In the illustrated example, such float body 2 is configured by combining a float main body 20, a main valve body 21, and a sub-valve body 22. The float main body 20 comprises an inner cylinder 20a and an outer cylinder 20b so as to open a gap between both the inner cylinder 20a and the outer cylinder 20b. The float body 2 is housed on the above-mentioned cross-bridge pieces 14b so as to insert the short-sized cylinder-like body 14a of the lower body 14 into the outer cylinder 20b of this float main body 20. The inner cylinder 20a and the outer cylinder 20b of the float main body 20 are interconnected by a connecting piece 20c at an upper portion of the float main body 20. A compression coil spring 23, allowing an upper end of a spring to be in contact with this connecting piece 20c and allowing a lower end of the spring to be in contact with the cross-bridge pieces 14b, is housed between the inner cylinder 20a and the outer cylinder 20b of the float main body 20. Due to this spring 23, a certain amount of upward urging force acts on the float body 2.

Also, in the first example shown in FIGS. 1 to 7, an inner ring-like portion 20d and an outer ring-like portion 20e surrounding this inner ring-like portion 20d, are provided in the upper portion of the float main body 20. The main valve body 21 forms a short-sized cylinder shape whose upper end of the cylinder is blocked by a top plate 21a comprising an airflow hole 21b in the center. An outer face of the to plate 21a of the main valve body 21 is covered by elastic seal materials 21c. A window hole 21d is provided on a lateral portion of the main valve body 21. The main valve body 21 is combined so as to be vertically movable relative to the float main body 20 such that the outer ring-like portion 20e is housed on the inside, and also such that a projecting portion 20f formed in the outer ring-like portion 20e is housed in this window hole 21d. The sub-valve body 22 is located on a lower side of the main valve body 21 and configured so as to form a plate shape blocking the airflow hole 21b of the main valve body 21 from the inside. Two or above arm pieces 22a, comprising claw portions 22b projecting downwardly and also projecting inwardly to a lower end, are provided on outer edge portions of the sub-valve body 22. The sub-valve body 22 is combined with the upper portion of the float main body 20 so as to be vertically movable such that the claw portions 22b of the arm pieces 22a are inserted under a lower surface of the inner ring-like portion 20d so as to hook on. A height of an engaging portion 22c in the claw portion 22b of one of the arm pieces 22a of the sub-valve body 22 is positioned in a higher side than that of the other arm piece 22a. After the float body 2 is seated, a pressure inside the tank inside Ta and a pressure inside the case 1 are attempted to be balanced through the airflow section 12, and the fuel liquid level inside the case 1 declines, so that the sub-valve body 22 descends while slanting by the descending float main body 20. (FIG. 7) Thereby, the airflow hole 21b of the main valve body 21 is opened, and by opening this airflow hole 21b, the whole float body 2 descends so that the airflow valve opening 10 is completely released.

In the first example shown in FIGS. 1 to 7, basically, the fueling into the tank inside Ta is allowed by the airflow due to the following airflow path R.

The inflow section 11 on a lower end of the case 1→between the float body 2 and an inner face of the case 1→the airflow valve opening 10→the connecting tube portion 30a of the flange 3→a tube connected to this connecting tube portion 30a and the like.

Figure 1:
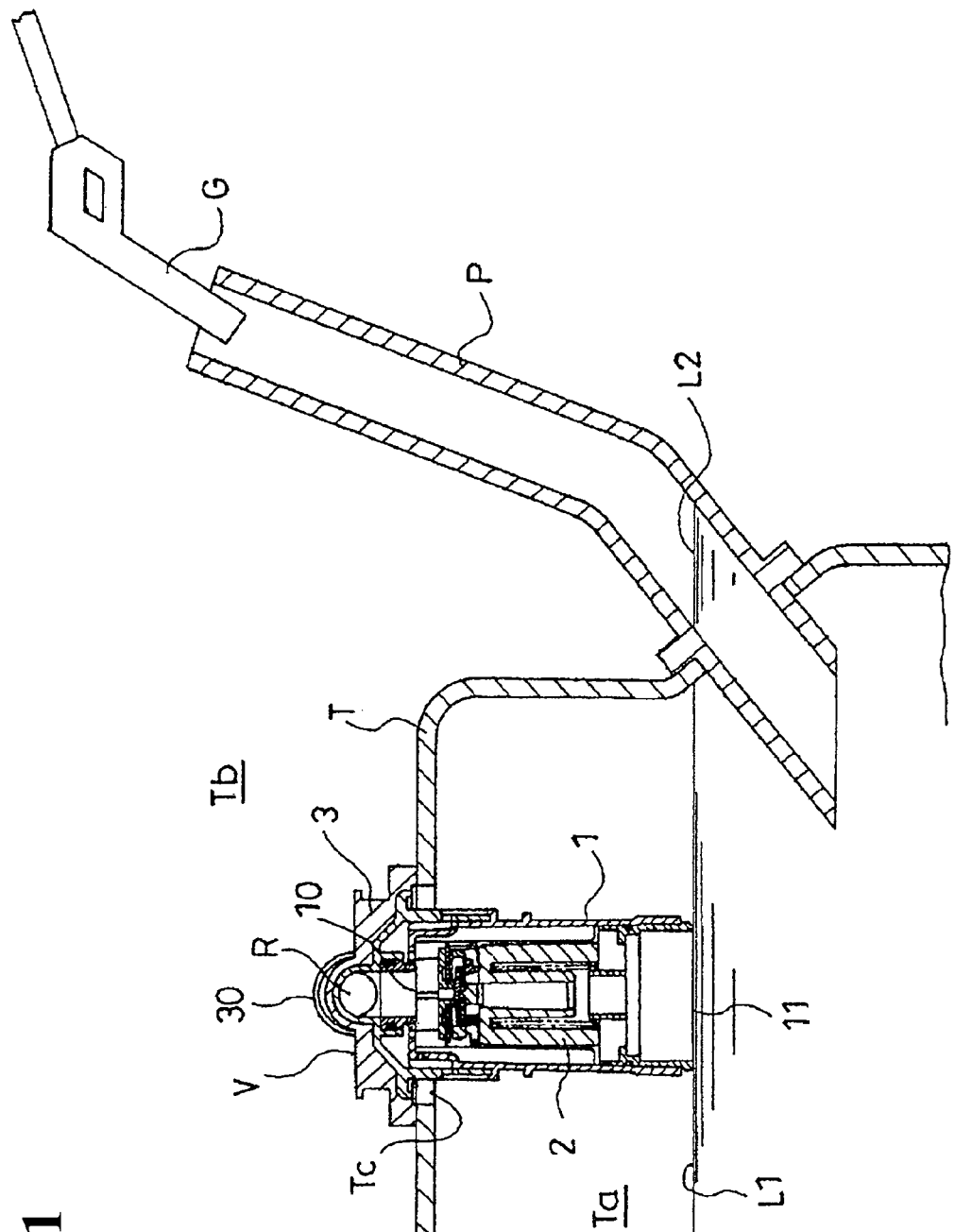
FIG. 1 schematically shows a state wherein a first example of a valve device configured by applying the present invention is provided in a fuel tank.
Figure 2:
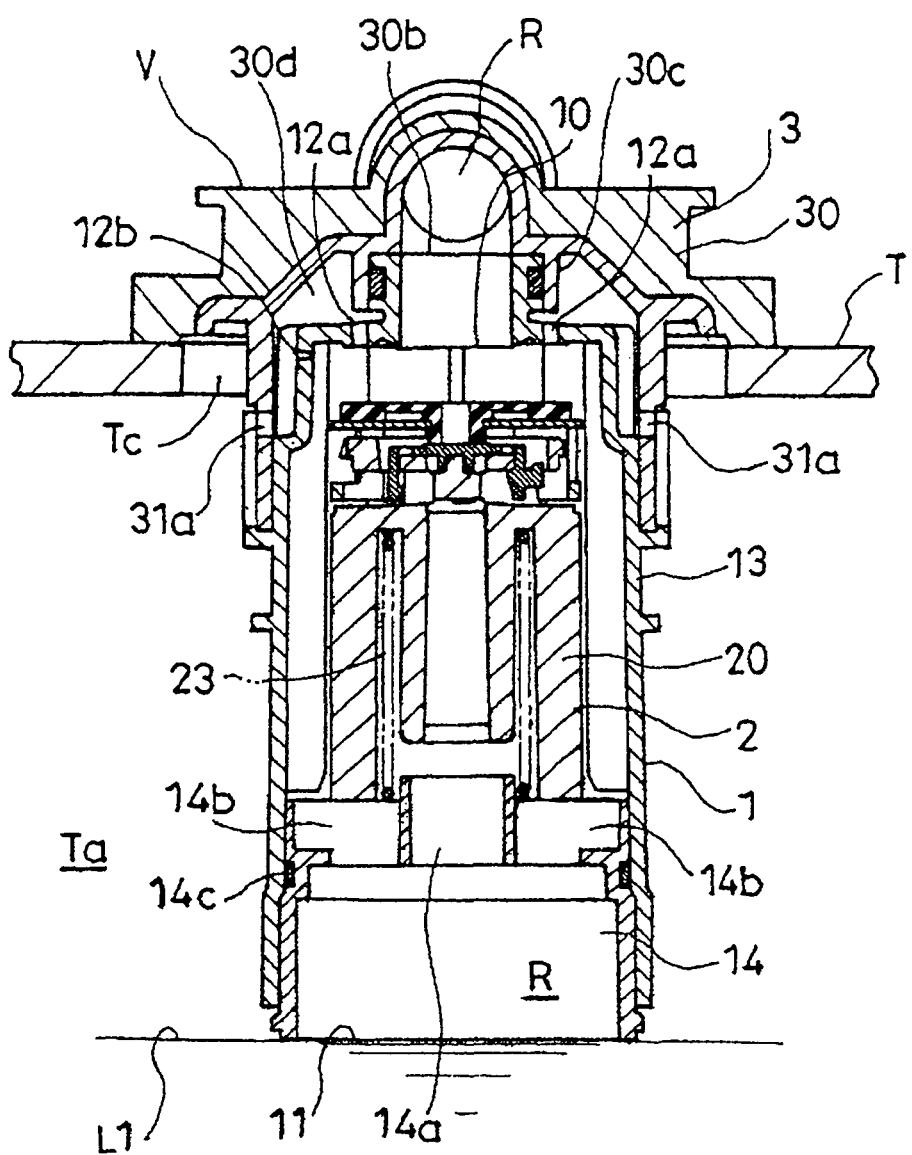
FIG. 2 shows the valve device of the first example in cross-section, and concretely shows a state wherein a fuel liquid level inside the tank reaches a level of an inflow section provided in a lower end of this valve device.
Figure 3:
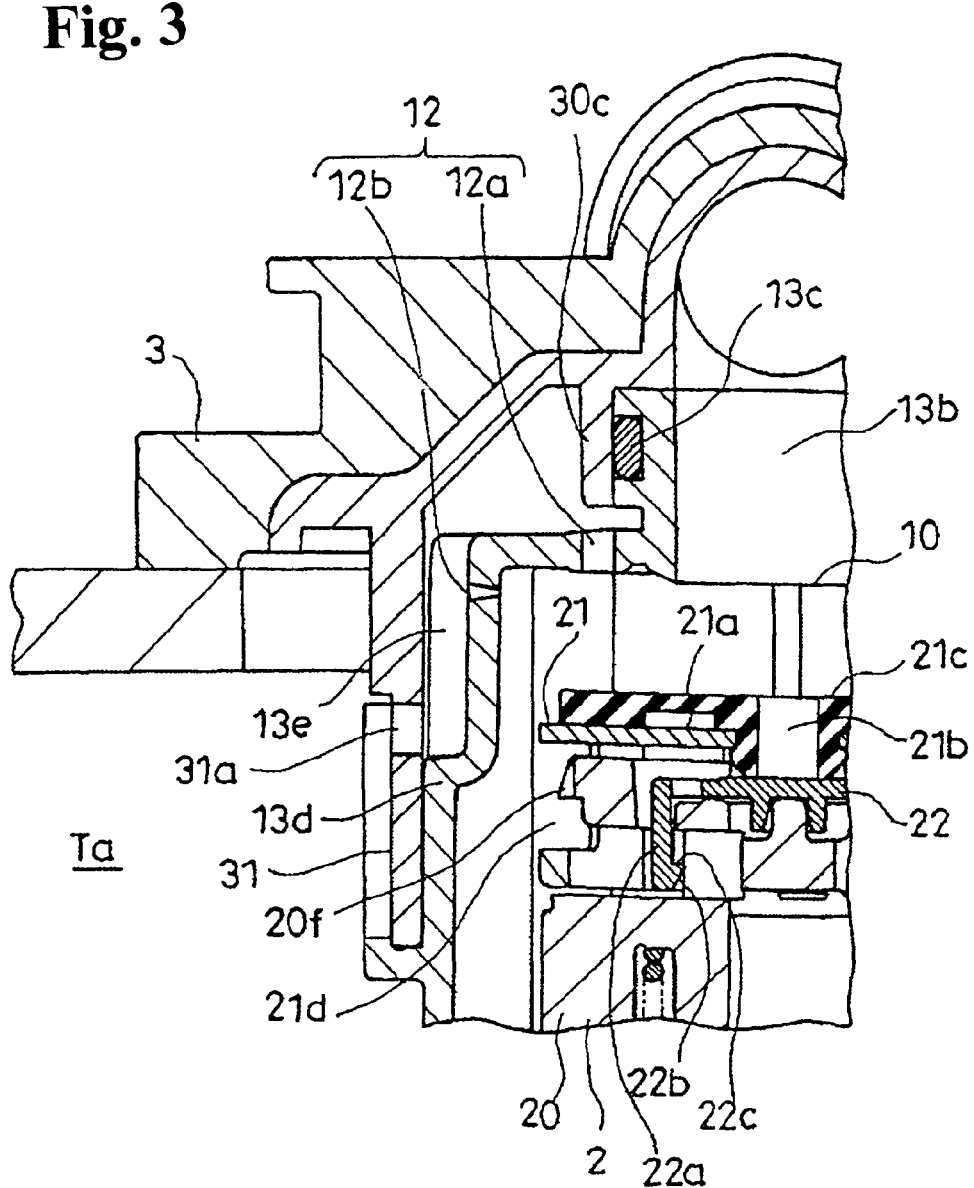
FIG. 3 shows enlarged essential parts of FIG. 2.
Figure 4:
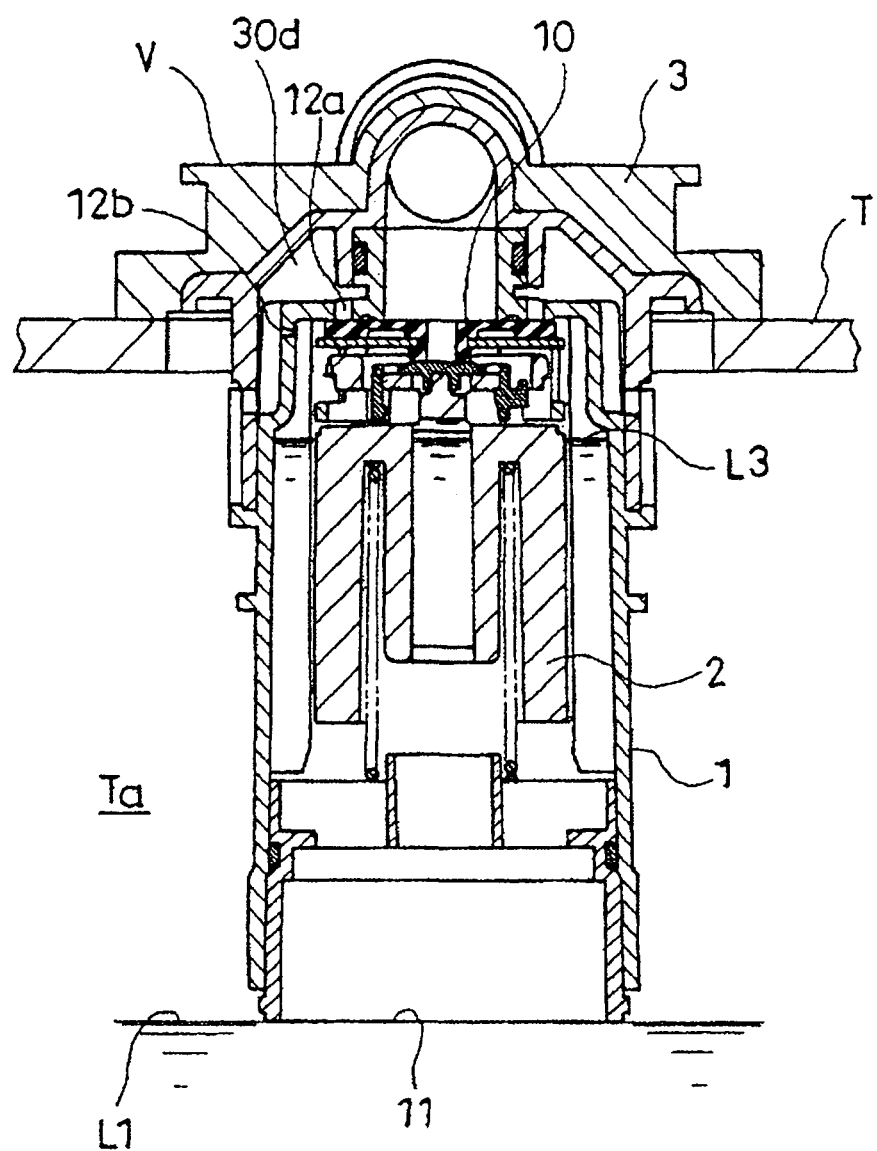
FIG. 4 shows the valve device of the first example in cross-section, and concretely shows a state (seated state) wherein an airflow valve opening is blocked since fueling is continued from the state of FIG. 2, fuel flows into a case configuring the valve device, and a float body is elevated.
Figure 5:
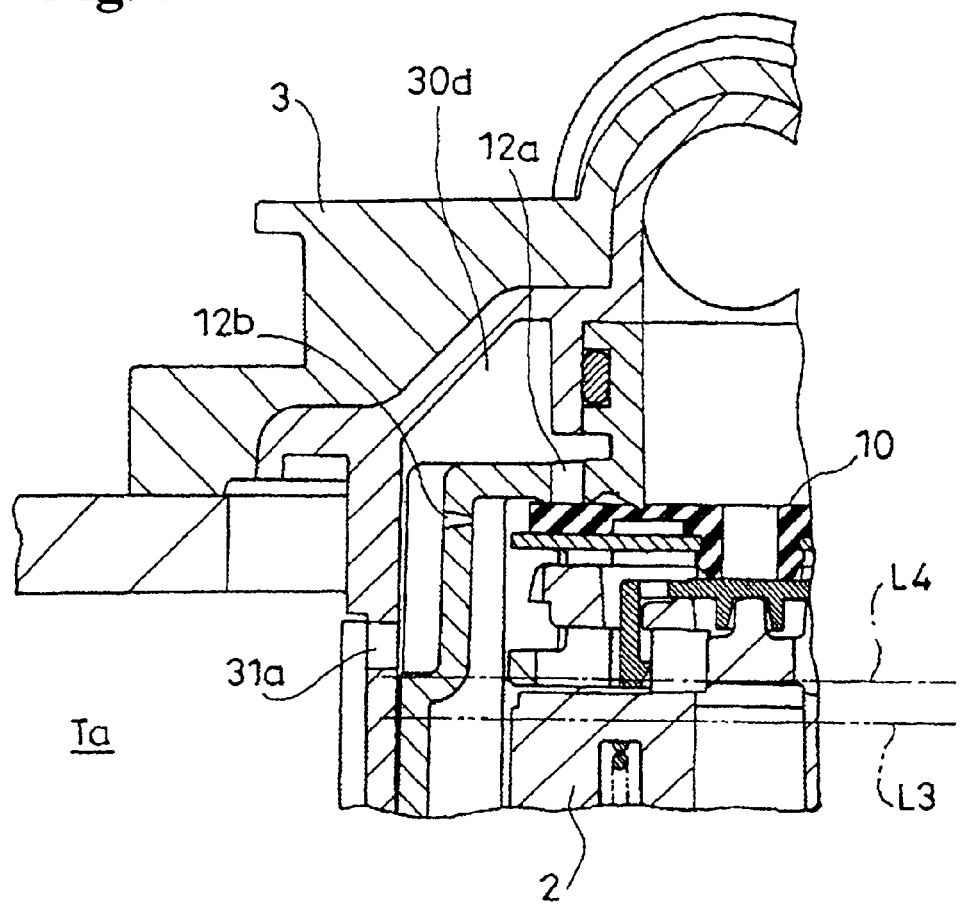
FIG. 5 shows the enlarged essential parts of FIG. 4.
Figure 6:
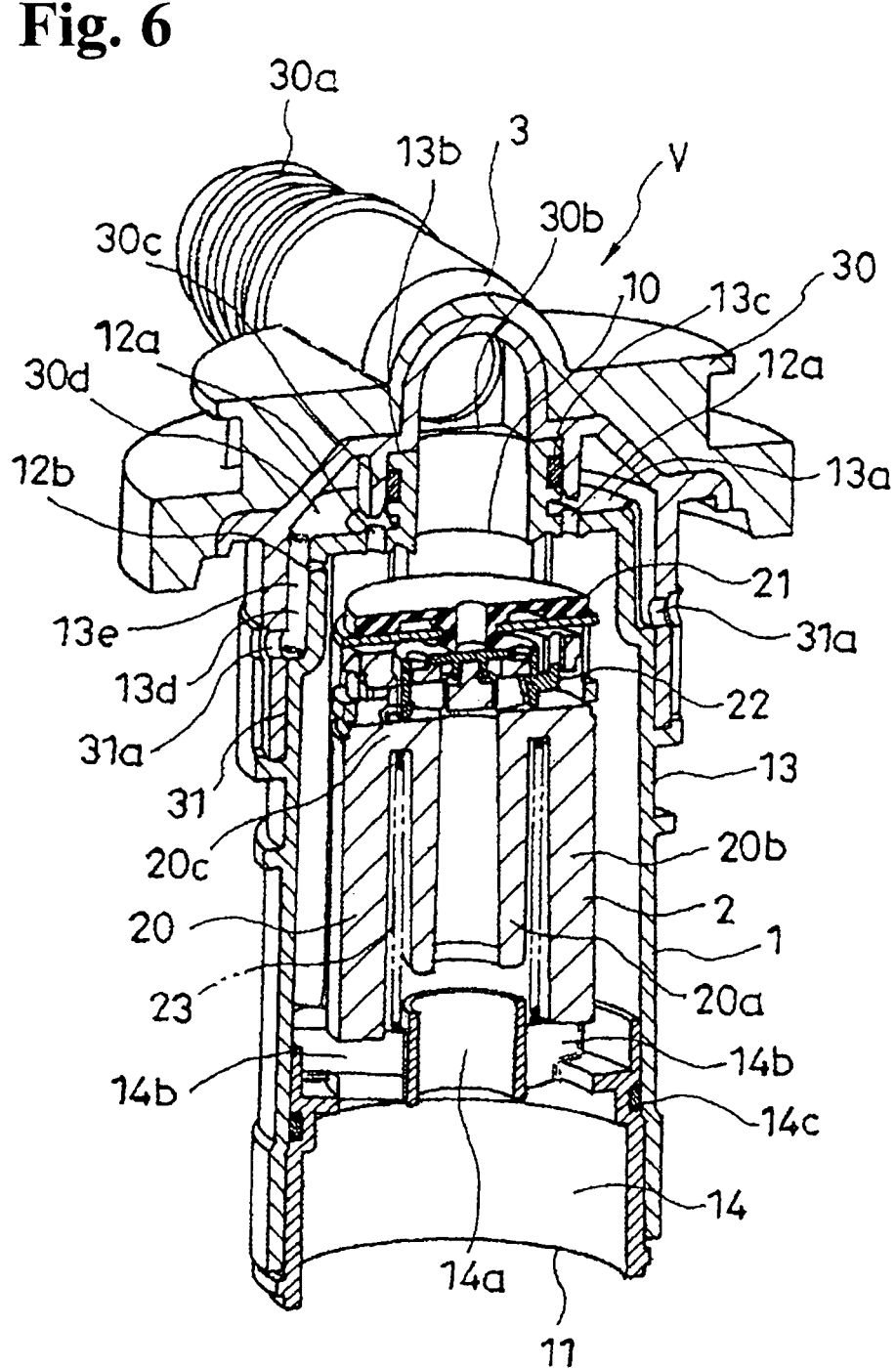
FIG. 6 shows an overall structure of the valve device of the first example in a cross-sectional state.
Figure 7:
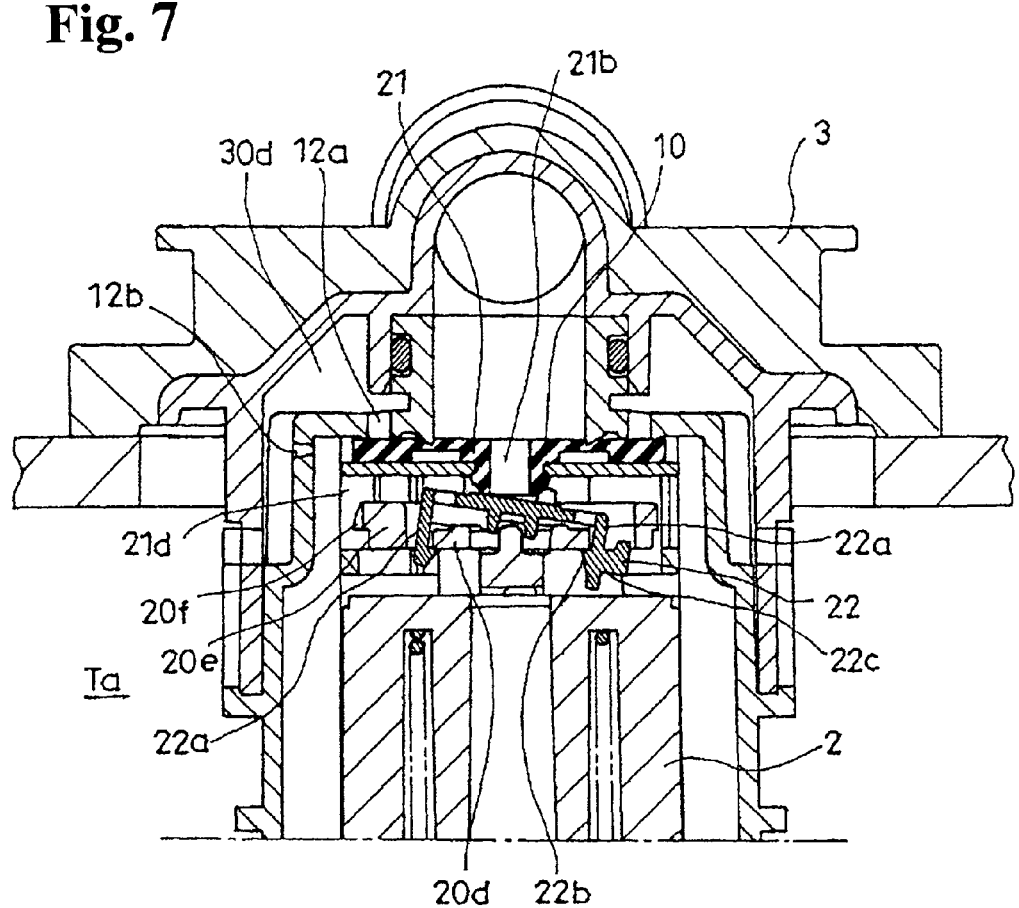
FIG. 7 shows a state immediately after the fuel liquid level inside the case declining from the state of FIG. 4 and the float body starting to descend.

Until the fuel liquid level L1 of the tank inside Ta reaches the inflow section 11 of the case 1, the airflow of the tank inside and outside Ta, Tb is ensured through this inflow section 11 and the airflow section 12. When the fuel liquid level L1 of the tank inside Ta reaches the inflow section 11 of the case 1, the pressure of the tank inside Ta is elevated and the inside of the case 1 has the pressure lower than that of the tank inside Ta, so that the fuel inflows into the case 1. Consequently, the airflow of the tank inside and outside Ta, Tb is carried out only through the airflow section 12. After this, when the fuel poured into the case 1 reaches the predetermined liquid level, the float body 2 is elevated, the airflow valve opening 10 is blocked, the fuel liquid level L2 inside the filler pipe P is elevated, and the sensor of the fueling gun G is allowed to detect the full tank. The airflow section 12, in the illustrated example, the first and second through-holes 12a, 12b are formed in higher sides than the water line L3 of the float body 2 at this time. (FIG. 4, FIG. 5) Due to this detection, although the fueling is stopped, a fuel liquid level L4 inside the case 1 at this time reaches a slightly higher side than this water line L3. (FIG. 5)

When the fueling is stopped, due to the airflow through the airflow section 12, a pressure difference between the tank inside Ta and the inside of the case 1 gradually diminishes, the fuel liquid level inside the case 1 declines, the float body 2 descends, and the airflow valve opening 10 is opened again. After that, the airflow through the airflow section 12 and the airflow valve opening 10 is carried out, and the fuel liquid level L2 inside the filler pipe P is also descended.

In such valve device V, at the seating time of the above-mentioned float body 2, the above-mentioned airflow section 12 is restricted. Concretely, the first through-holes 12a, which are formed in the top plate portion 13a of the upper body 13, are blocked from the lower side by the main valve body of the float body 2 which is elevated up to a position blocking the airflow valve opening 10 by the main valve body 21, so that the inside of the case 1 and the tank inside Ta are interconnected only by the second through-hole 12b. Thereby, after the sensor of the fueling gun G detects the full tank and stops the fueling thereof, the difference between the pressure inside the case 1 and the pressure of the tank inside Ta can gradually diminish, and the overfilling to the fuel tank T can be prevented by preventing the immediate decline of the fuel liquid level L2 inside the filler pipe P. When the pressure difference between the inside of the case 1 and the tank inside Ta is decreased by the second through-hole 12b, and when the fuel liquid level inside the case 1 declines lower than the predetermined liquid level (the level of the above-mentioned water line L3), the float body 2 descends, and the first through-holes 12a are opened. Accordingly, a state wherein the airflow section 12 is restricted, i.e., a state wherein an airflow amount through the airflow section 12 is decreased, is released, and as long as the fuel liquid level L1 of the tank inside Ta is located in a higher side than the inflow section 11 of the fuel of the case 1, the tank inside and outside Ta, Tb are interconnected through the first and second through-holes 12a, 12b.

In the example shown in FIGS. 1 to 7, such airflow section 12 is configured by the first through-holes 12a as main airflow sections and the second through-hole 12b as a sub-airflow section. At the seating time of the float body 2, the main airflow section is blocked and the pressure of the tank inside Ta and the pressure inside the case 1 are attempted to be gradually balanced by the sub-airflow section. In this example, the first through-holes 12a are respectively provided on both sides in a diametrical direction of the case 1. On the other hand, the second through-hole 12b is provided only in one portion. Also, in the example shown in FIGS. 1 to 7, the first through-holes 12a as the main airflow sections are blocked by the float body 2 at the seating time of the float body 2. Also, the second through-hole 12b as the sub-airflow section is configured as an orifice, and a flow passage cross-sectional area thereof is made smaller than a flow passage cross-sectional area of the first through-holes 12a as the main airflow sections. (FIG. 1, FIG. 5) Thereby, in the example shown in FIGS. 1 to 7, a function for preventing the difference between the pressure inside the case 1 and the pressure of the tank inside Ta from immediately diminishing after the full tank, can effectively work without increasing the number of components.

Second Example Shown in FIG. 8

As shown in FIG. 8, the valve device V shown in FIGS. 1 to 7 configures the airflow section 12 only by the first through-holes 12a of the case 1. Also, the airflow section 12 may be restricted at the seating time of the float body 2 such that only one portion of the first through-holes 12a is blocked at the maximum elevated time of the float body 2 by an upper portion blocking the airflow valve opening 10 in the float body 2, in the illustrated example, by the main valve body 21.

Third Example Shown in FIGS. 9 to 12(c)

The valve device V according to the third example shown in FIGS. 9 to 12(c) also configures the airflow section 12 only by the first through-holes 12a of the case 1, and differs from the valve device V according to the first example shown in FIGS. 1 to 7. For the rest, the valve device V according to this third example comprises substantially the same structure with the valve device V according to the first example, so that regarding the same structural portions, the same symbols used in the drawings showing the first example are assigned to drawings showing the third example, and their explanations are omitted.

Also in this third example, one portion of the float body 2 is inserted into the airflow sections 12 at the seating time, so that the airflow sections 12 are restricted. In the illustrated example, edge portions of the top plate 21a of the main valve body 21 configuring the float main body 20 are positioned on the outer side of the edge portions of the elastic seal materials 21c. Also, projecting portions 21e, projecting upwardly from portions which are on an upper face of this top plate 21a and are positioned on the outside of edge portions of the elastic seal materials 21c, are formed. The projecting portions 21e function as one portion of the above-mentioned float body 2. Specifically, the first through-holes 12a are formed in the top plate portion 13a of the upper body 13 of the case 1 in a position immediately above the projecting portions 21e of the float body 2 which is in a descending position. At the seating time of the float body 2, the projecting portions 21e are inserted into the first through-holes 12a from the lower side. In the illustrated example, at the seating time of the float body 2, a gap is formed between outer circumferential faces of the projecting portions 21e which are inserted into the first through-holes 12a and hole walls of the first through-holes 12a. Thereby, at this seating time, the airflow section 12 is restricted.

FIGS. 11(a), 11(b), 12(a), 12(b) show examples in which the projecting portions 21e further comprise a portion 21f whose transverse area is the largest between upper and lower ends thereof as one portion of the above-mentioned float body 2. If the transverse area of such projecting portion 21e is structured so as to become approximately equal at any position of an up-and-down direction thereof, the size of an insertion amount into the first through-hole 12a of the projecting portion 21e is affected by the size of the airflow amount of the airflow section 12. Specifically, the more insertion amount increases, the more airflow amount decreases. On the other hand, if the examples are structured such as FIGS. 11(a), 11(b), 12(a), 12(b), since the airflow section 12 is restricted largely at the portion 21f whose transverse area is the largest in the projecting portion 21e as one portion of the above-mentioned float body 2, regardless of the size of an insertion amount of such projecting portion 21e relative to the first through-hole 12a, the airflow amount of the airflow section 12 in this restricted state can be maintained in a certain value as much as possible.

Figure 11A:
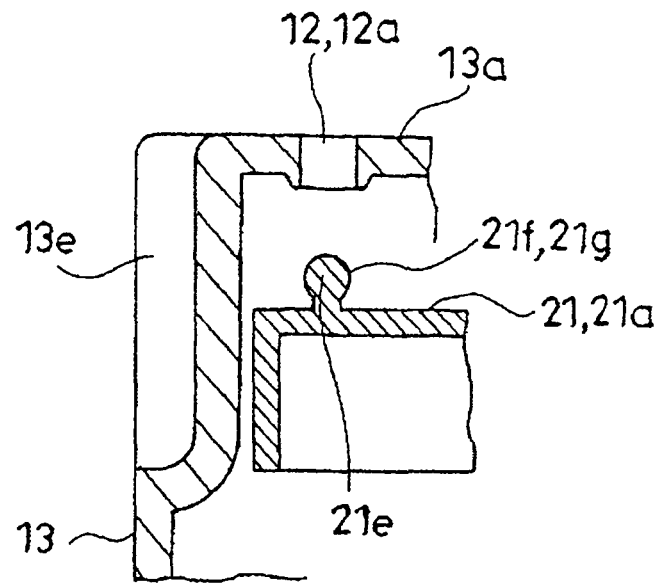
Figure 11B:
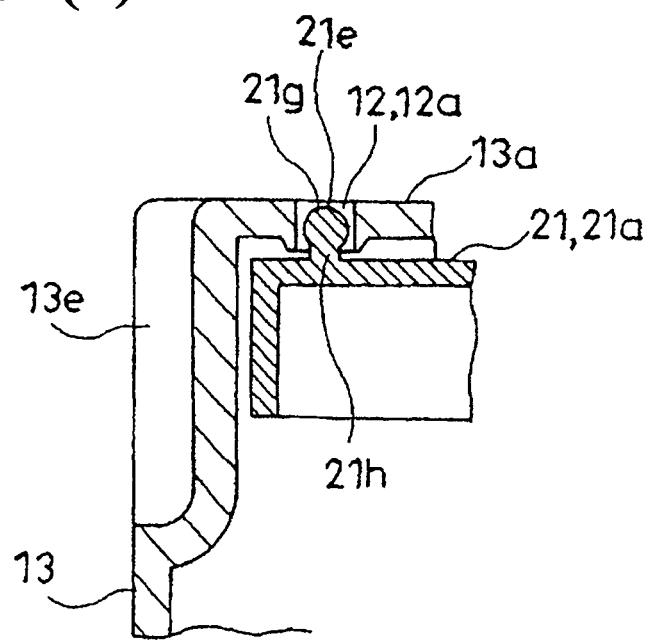

In FIGS. 11(a), 11(b), the projecting portion 21e is formed by a spherical head portion 21g connected to the top plate 21a of the main valve body 21 through a neck portion 21h, and creates the portion 21f wherein the above-mentioned traverse area is the largest.

Figure 12A:
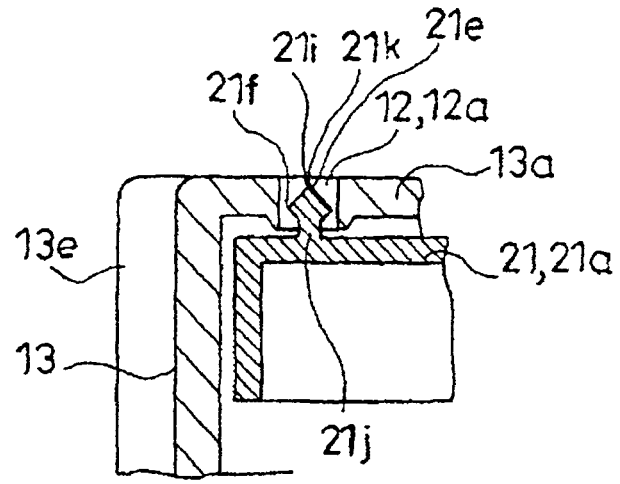
FIG. 12(a) shows another modified example of the projecting portion in the third example, FIG. 12(b) further shows another modified example of the projecting portion in the third example.

As shown in FIG. 12(a), the projecting portion 21e is formed by a head portion 21i connected to the top plate 21a of the main valve body 21 through a neck portion 21j. Also, the projecting portion 21e can create the portion 21f wherein the above-mentioned traverse area is the largest by making a longitudinal sectional shape of this head portion 21i gradually widen toward the intermediate position from an upper end 21k thereof, and taper toward a connected position to the neck portion 21j from this intermediate position.

Figure 12B:
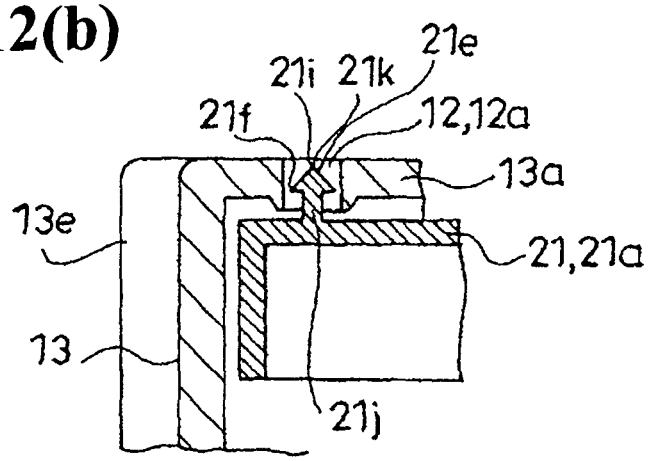
FIG. 12(c) shows an example where both the projecting portion and an airflow section in the third example are changed, as the state of the seating time of the float body, respectively.

Also, as shown in FIG. 12(b), the projecting portion 21e is formed by the head portion 21i connected to the top plate 21a of the main valve body 21 through the neck portion 21j. Also, the portion 21f wherein the above-mentioned traverse area is the largest can be created by structuring the longitudinal sectional shape of this head portion 21i so as to become an umbrella shape which gradually widens toward the connected position to the neck portion 21j from the upper end 21k thereof.

Figure 12C:
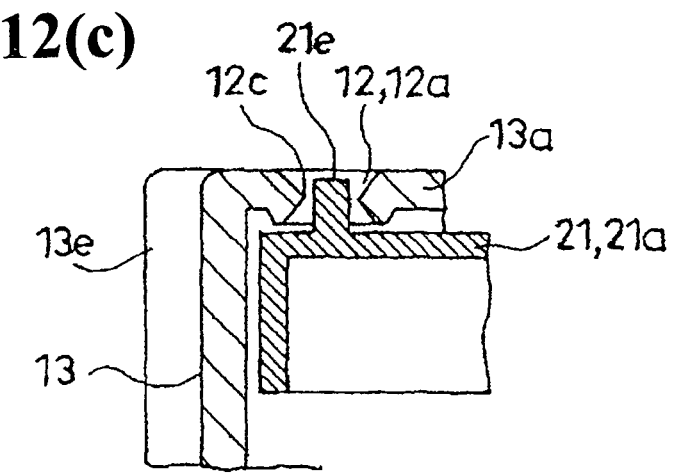

On the other hand, as shown in FIG. 12(c), while the traverse area of the projecting portion 21e as one portion of the above-mentioned float body 2 is made approximately equal even at any position of the up-and-down direction thereof, a portion 12c whose flow passage is the narrowest is formed between upper and lower openings thereof in the above-mentioned airflow section 12. Accordingly, regardless of the size of the insertion amount of such projecting portion 21e relative to the first through-hole 12a as the airflow section 12, the airflow amount of the airflow section 12 in this restricted state can be maintained in a certain value as much as possible.

Fourth Example Shown in FIGS. 13(a), 13(b)

The valve device V according to the fourth example shown in FIGS. 13(a), 13(b) also configures the airflow section 12 only by the first through-hole 12a of the case 1, so that the valve device V according to the fourth example differs from the valve device V according to the first example shown in FIGS. 1 to 7. For the rest, the valve device V according to this fourth example comprises substantially the same structure with the valve device V according to the first example, so that regarding the same structural portions, the same symbols used in the drawings showing the first example are assigned to drawings showing the fourth example, and their explanations are omitted.

In this fourth example, the first through-hole 12*a* which becomes the airflow section 12 is provided inside a depressed portion 13*g* which is open upwardly and laterally and formed in a shoulder portion 13*f* located between the upper portion of the case 1, in the illustrated example, the top plate portion 13*a* of the upper body 13, and a lateral portion of the case 1, in the illustrated example, a lateral portion 13*d* of the upper body 13. Also, one portion of the float body 2 is inserted into this first through-hole 12*a* at the seating time, so that the airflow section 12 is restricted.

In the illustrated example, a circling wall portion 21*m*, projecting downwardly from an edge portion of the top plate 21*a* of the main valve body 21 configuring the float body 2, is formed. Also, a projecting portion 21*n*, inserted into such first through-hole 12*a* from the lower side at the seating time, is formed on the outer side of this circling wall portion 21*m*, and this projecting portion 21*n* functions as one portion of the above-mentioned float body 2. Specifically, the first through-hole 12*a* is formed in a position immediately above the projecting portion 21*n* of the float body 2 which is in a descending position. In the illustrated example, at the seating time of the float body 2, a gap is formed between an outer circumferential face of the projecting portion 21*n* which is inserted into this first through-hole 12*a* and a hole wall of the first through-hole 12*a*. Thereby, at this seating time, the airflow section 12 is restricted.

Fifth Example Shown in FIGS. 14(*a*), 14(*b*)

The valve device V according to the fifth example shown in FIGS. 14(*a*), 14(*b*) also does not include the second through-hole, so that the valve device V according to the fifth example differs from the valve device V according to the first example shown in FIGS. 1 to 7. For the rest, the valve device V according to this fifth example comprises substantially the same structure with the valve device V according to the first example, so that regarding the same structural portions, the same symbols used in the drawings showing the first example are assigned to drawings showing the fifth example, and their explanations are omitted.

In this fifth example, the airflow section 12 is configured by a depressed place 13*h* formed in the upper portion of the case 1, in the illustrated example, the top plate portion 13*a* of the upper body 13, and through-holes 13*i* which become the first through-holes 12*a* formed on sidewalls of this depressed place 13*h*. In the illustrated example, such depressed place 13*h* is provided in the case 1 such that the inside of a bulging portion 13*j*, projecting upwardly from the upper face of the top plate portion 13*a* of the upper body 13 of the case 1, is a space interconnected to the inside of the case 1. The respective through-holes 13*i* are formed on a pair of facing side walls configuring this bulging portion 13*j*. Then, in this example, one portion of the float body 2 is inserted into this depressed place 13*h* at the seating time thereof, so that the airflow section 12 is restricted. In the illustrated example, the edge portions of the top plate 21*a* of the main valve body 21 configuring the float main body 20 are positioned on outer sides of the edge portions of the elastic seal materials 21*c*. Also, projecting portions 21*o*, projecting upwardly from the portions which are on the upper face of this top plate 21*a* and are located on the outer side of the edge portions of the elastic seal materials 21*c*, are formed. The projecting portions 210 function as one portion of the above-mentioned float body 2. Specifically, the above-mentioned depressed place 13*h* is formed in the top plate portion 13*a* of the upper body 13 of the case 1 in the position immediately above the projecting portion 210 of the float body 2 which is in the descending position. At the seating time of the float body 2, the projecting portions 210 are inserted into the depressed places 13*h* from the lower side. In the illustrated example, at the seating time of the float body 2, a gap is formed between outer circumferential faces of the projecting portions 21*o* which are inserted into the depressed places 13*h* and inner walls of the depressed places 13*h*. Thereby, at this seating time, the airflow section 12 is restricted.

Sixth Example Shown in FIGS. 15(*a*), 15(*b*)

The valve device V according to the sixth example shown in FIGS. 15(*a*), 15(*b*) also does not include the second through-hole, so that the valve device V according to the sixth example differs from the valve device V according to the first example shown in FIGS. 1 to 7. For the rest, the valve device V according to this sixth example comprises substantially the same structure with the valve device V according to the first example, so that regarding the same structural portions, the same symbols used in the drawings showing the first example are assigned to drawings showing the sixth example, and their explanations are omitted.

In this sixth example, the first through-hole 12*a* configuring the airflow section 12 is formed on an upper side of an auxiliary space 13*k* formed in the lateral portion 13*d* of the upper body 13 of the case 1. This auxiliary space 13*k* is formed such that one portion of the lateral portion 13*d* of the upper body 13 bulges to the outside. A bulging portion 13*m* is formed long in an up-and-down direction, and a top portion 13*n* thereof is positioned on a lower side than the top plate portion 13*a* of the upper body 13. Then, the first through-hole 12*a* is formed in the top portion 13*n* of this bulging portion 13*m*. An upper portion of the auxiliary space 13*k* is divided from the rest of the space inside the case 1 by a dividing plate 13*o*. In the illustrated example, a circling wall portion 21*p*, projecting downwardly from the edge portion of the top plate 21*a* of the main valve body 21 configuring the float body 2, is formed. Also, a restricting member 21*q*, inserted into such auxiliary space 13*k* from the lower side at the seating time, is disposed outside this circling wall portion 21*p*. The restricting member 21*q* is formed so as to be rod-like with a width inserted into this auxiliary space 13*k* by making a gap between an outer circumferential face of the restricting member 21*q* and an inner wall of the auxiliary space 13*k*. Also, the lower end of the restricting member 21*q* is connected to an outer face of the above-mentioned circling wall portion 21*p* through an arm 21*r*. At the above-mentioned seating time, the restricting member 21*q* is inserted into a space which is in a higher side than a lower end 13*p* of the dividing plate 13*o* in the auxiliary space 13*k*, and a flow passage of the auxiliary space 13*k* continuing to the first through-holes 12*a*, i.e., the airflow section 12 is restricted.

Seventh Example Shown in FIGS. 16(*a*), 16(*b*)

The valve device V according to the seventh example shown in FIGS. 16(*a*), 16(*b*) also does not include the second through-hole, so that the valve device V according to the seventh example differs from the valve device V according to the first example shown in FIGS. 1 to 7. For the rest, the valve device V according to this seventh example comprises substantially the same structure with the valve device V according to the first example, so that regarding the same structural portions, the same symbols used in the drawings showing the first example are assigned to drawings showing the seventh example, and their explanations are omitted.

In this seventh example, the airflow section 12 is restricted by a sub-float 4 which is elevated the most at the seating time of the float body 2.

In this seventh example, the first through-holes 12a configuring the airflow section 12 are formed on lateral sides of an auxiliary space 13q formed in the lateral portion 13d of the upper body 13 of the case 1. This auxiliary space 13q is formed such that one portion of the lateral portion 13d of the upper body 13 bulges to the outside. A bulging portion 13r is formed long in an up-and-down direction; and the first through-holes 12a are respectively formed on both side portions of such bulging portion 13r. Wall portions 13s are formed so as to respectively continue in an up-and-down direction on both sides which sandwich an entrance inside the case 1 of the bulging portion 13r. Also, return portions 13t, projecting toward other wall portions 13s, are formed on projecting ends of the wall portions 13s. Accordingly, such auxiliary space 13q is separated from the rest of the space inside the case 1. In the illustrated example, the sub-float 4 is configured long in an up-and-down direction, housed inside the auxiliary space 13q so as to be vertically movable, and also comprises a base portion 4a guided by the above-mentioned pair of wall portions 13s, 13s, and a branch portion 4b inserted into the bulging portion 13r. Such sub-float 4 is configured so as to have a size making a gap between an outer face of the sub-float 4, an inner face of the bulging portion 13r configuring the auxiliary space 13q, and the wall portions 13s. Then, such sub-float 4 abuts against the first through-holes 12a configuring the airflow section 12 by moving to an upper side of the auxiliary space 13q at the seating time of the above-mentioned float body 2, so that the airflow section 12 is restricted.

Figure 17A:
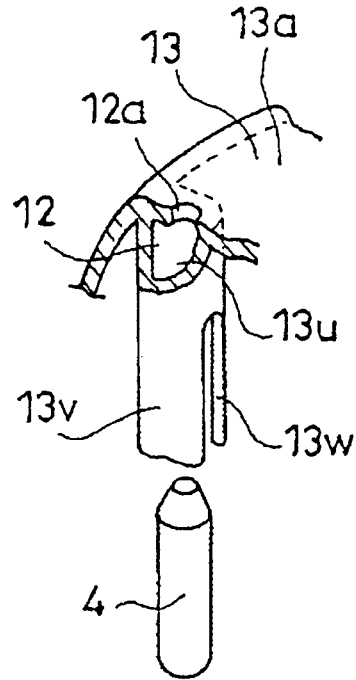
FIG. 17(a) shows the essential parts of an eighth example of the valve device which is made by changing one portion of the structure of the first example as a perspective state.
Figure 17B:
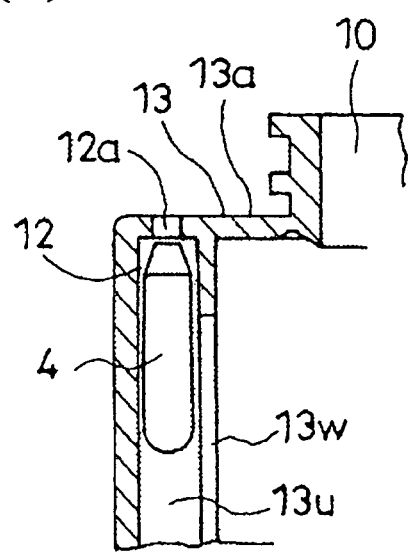
FIG. 17(b) shows the essential portions thereof at the seating time of the float body in cross-section.

Eighth Example Shown in FIGS. 17(a), 17(b)

The valve device V according to the eighth example shown in FIGS. 17(a), 17(b) also does not include the second through-hole, so that the valve device V according to the eighth example differs from the valve device V according to the first example shown in FIGS. 1 to 7. For the rest, the valve device V according to this eighth example comprises substantially the same structure with the valve device V according to the first example, so that regarding the same structural portions, the same symbols used in the drawings showing the first example are assigned to drawings showing the eighth example, and their explanations are omitted.

Even in this eighth example, the airflow section 12 is restricted by the sub-float 4 which is elevated the most at the seating time of the float body 2.

Even in this eighth example, the first through-holes 12a configuring the airflow section 12 are formed on lateral sides of an auxiliary space 13u formed in the lateral portion 13d of the upper body 13 of the case 1. This auxiliary space 13u is formed inside the upper body 13 by forming a tubular portion 13v which allows a tube upper end to be connected to an inner face of the top plate portion 13a. A split groove 13w, extending upwardly from a tube lower end, is formed on a side facing the inward of the case 1 in the tubular portion 13v. The first through-holes 12a are formed in the top plate portion 13a of the upper body 13 blocking the tube upper end of such tubular portion 13v. In the illustrated example, the sub-float 4 is configured so as to be a rod-like body which is configured long in an up-and-down direction and housed in the above-mentioned tubular portion 13v so as to be vertically movable. The sub-float 4 is configured so as to have a width making a gap between an outer face thereof and an inner face of the tubular portion 13v configuring such auxiliary space 13q. Then, such sub-float abuts against the first through-hole 12a configuring the airflow section 12 by moving to the upper side of the auxiliary space 13q at the seating time of the above-mentioned float body 2, so that the airflow section 12 is restricted.

Incidentally, all contents of the specifications, claims, drawings, and abstracts of Japanese Patent Applications No. 2008-108879 filed on Apr. 18, 2008 and No. 2009-029979 filed on Feb. 12, 2009 are cited in their entirety herein and are incorporated as a disclosure of the specification of the present invention.

What is claimed is:

1. A valve device for a fuel tank attached to the fuel tank, comprising:
a case having an airflow valve opening which communicates with an outside of the tank, on an upper portion, and a fuel inflow section located on a lower side of the airflow valve opening; and
a float body housed in the case so as to be vertically movable, and seated in said airflow valve opening by being elevated by fuel flowing into the case through said inflow section when the fuel in the tank reaches the fuel inflow section,
wherein the case includes an airflow section which interconnects an inside of the tank and an inside of the case at a higher side than a waterline of the float body at a seating time of the float body to the airflow valve opening, and at said seating time, the airflow section is restricted.

2. A valve device for a fuel tank according to claim 1, wherein the airflow section comprises a main airflow section and a sub-airflow section, and at the seating time of the float body, the main airflow section is blocked and a pressure inside the tank and a pressure inside the case are gradually balanced by the sub-airflow section.

3. A valve device for a fuel tank according to claim 2, wherein a flow passage cross-sectional area of the sub-airflow section is smaller than a flow passage cross-sectional area of the main airflow section.

4. A valve device for a fuel tank according to claim 2, wherein at the seating time of the float body, the main airflow section is blocked by the float body.

5. A valve device for a fuel tank according to claim 1, wherein one portion of the float body is inserted into the airflow section at the seating time so that the airflow section is restricted.

6. A valve device for a fuel tank according to claim 5, wherein at the seating time, one portion of the float body is inserted into the airflow section from a lower side, and one portion of the float body comprises a portion whose transverse area is the largest between upper and lower ends thereof.

7. A valve device for a fuel tank according to claim 5, wherein at the seating time, one portion of the float body is inserted into the airflow section from a lower side, and the airflow section comprises a portion whose flow passage is the narrowest between upper and lower openings thereof.

8. A valve device for a fuel tank according to claim 1, wherein the airflow section includes a notch portion which is formed in the case and opened upwardly and laterally, and one portion of the float body is inserted into the notch portion at the seating time so that the airflow section is restricted.

9. A valve device for a fuel tank according to claim 1, wherein the airflow section includes a depressed portion formed in an upper portion of the case, and through-holes formed on sidewalls of this depressed portion, and
one portion of the float body is inserted into the depressed portion at the seating time so that the airflow section is restricted.

10. A valve device for a fuel tank according to claim 1, wherein by a sub-float which is elevated most at the seating time of the float body, the airflow section is restricted.

11. A valve device for a fuel tank according to claim 1, further comprising a flange to which the case is attached, the flange being formed separately from the case and including a cylindrical connecting portion having an airflow hole communicating with an inside of the tank, and a space formed between an inside of the flange and an outside of the case so that the airflow section communicates with the inside of the tank through the space and the airflow hole.

12. A valve device for a fuel tank according to claim 11, wherein the case includes a top plate portion forming the upper portion, and a side portion extending downwardly from the top plate portion to thereby form an upper space above the top plate and a groove portion between the side portion and the cylindrical connecting portion.

13. A valve device for a fuel tank according to claim 12, wherein the top plate portion includes a main airflow section, which is closed by the float body when the airflow valve opening is closed, and the side portion includes a sub-airflow section, which is not closed by the float body.

14. A valve device for a fuel tank according to claim 11, wherein the airflow section in the case communicating with the space is at least partly closed by the float body when the airflow valve opening is closed.

15. An overfilling preventing device for a fuel tank, comprising:
an interconnection device interconnecting a space on a fuel liquid surface inside the fuel tank and an outside of the tank and having a case with an airflow valve opening;
a fueling stop device which allows a fuel liquid level inside a filler pipe to elevate by elevating a pressure inside the tank by blocking interconnection due to said interconnection device using elevation of the fuel liquid level by pouring fuel into the tank, and allows a sensor of a fueling gun to detect a full tank, the fueling stop device being disposed inside the case;
a decompression device for the pressure inside the tank which creates decline of the fuel liquid level inside the filler pipe after the detection of this full tank; and
a delay device delaying the decline of the fuel liquid level inside the filler pipe by this decompression device;
wherein the interconnection device interconnects an inside of the tank and an inside of the case at a higher side than a fuel liquid level of the fuel stop device at a seating time of the fuel stop device to the airflow valve opening, and at said seating time, the airflow section is restricted.

* * * * *